(12) United States Patent
Kim et al.

(10) Patent No.: US 7,614,906 B2
(45) Date of Patent: Nov. 10, 2009

(54) SECONDARY BATTERY AND A SECONDARY BATTERY MODULE USING THE SAME

(75) Inventors: Jae-Kyung Kim, Suwon-si (KR); Jun Sonu, Suwon-si (KR); Ki-Ho Kim, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 638 days.

(21) Appl. No.: 11/261,021

(22) Filed: Oct. 27, 2005

(65) Prior Publication Data
US 2006/0094289 A1  May 4, 2006

(30) Foreign Application Priority Data
Oct. 28, 2004  (KR) .............. 10-2004-0086600

(51) Int. Cl.
*H01R 3/00* (2006.01)
(52) U.S. Cl. .................................... 439/500
(58) Field of Classification Search ............ 439/500, 439/766, 754–756, 163; 429/182, 65, 100
See application file for complete search history.

(56) References Cited
U.S. PATENT DOCUMENTS

| 1,784,259 | A | * | 12/1930 | Wallenberg | 439/766 |
|---|---|---|---|---|---|
| 1,982,801 | A | * | 12/1934 | Gerking | 429/99 |
| 3,663,927 | A | * | 5/1972 | Bruner | 439/522 |
| 4,347,294 | A | * | 8/1982 | Mejia | 429/151 |
| 5,620,291 | A | * | 4/1997 | Hayes et al. | 411/552 |
| 5,692,865 | A | * | 12/1997 | Pratt | 411/55 |
| 7,074,095 | B2 | * | 7/2006 | Perng | 439/766 |
| 7,459,232 | B2 | * | 12/2008 | Lee | 429/56 |

FOREIGN PATENT DOCUMENTS

| JP | 9-223494 | 8/1997 |
|---|---|---|
| JP | 9-265975 | 10/1997 |

* cited by examiner

*Primary Examiner*—Alexander Gilman
(74) *Attorney, Agent, or Firm*—Christie, Parker & Hale, LLP

(57) ABSTRACT

A secondary battery module includes a connector, which electrically connects a first unit battery to an adjacent unit battery. The connector is connected to the first battery through a connecting member, which is connected to a terminal of the first battery. The connecting member has external threads and a flange on which the connector is positioned. The connector is also fitted to the connecting member and fixed thereto through a nut, which is joined with the external threads of the connecting member.

6 Claims, 8 Drawing Sheets

SECONDARY BATTERY AND A SECONDARY BATTERY MODULE USING THE SAME

CROSS REFERENCE TO RELATED APPLICATION

This application claims priority to and the benefit of Korean patent application No. 10-2004-0086600 filed in the Korean Intellectual Property Office on Oct. 28, 2004, the entire disclosure of which is incorporated herein by reference.

FIELD OF THE INVENTION

The present invention relates to a secondary battery and more particularly, to a secondary battery with an increased current collecting efficiency by improving the connecting structure between unit cells in the battery with high power and large capacity and to a secondary battery module using the same.

BACKGROUND OF THE INVENTION

Recently, high power secondary batteries using non-aqueous electrolytes with high energy density have been developed. These high power secondary batteries with large capacity, which are used for electric machinery requiring large electric power for example, electric vehicles, are formed by connecting a plurality of single batteries in series.

In general, a plurality of single secondary batteries (hereinafter, referred to as a unit cell) are connected in series or in parallel to form high power secondary batteries (hereinafter, referred to as a battery module). Each unit cell includes an electrode assembly having positive and negative electrodes and a separator interposed therebetween, a case with a space for housing the electrode assembly, a cap assembly connected with and sealing the case, and positive and negative terminals protruding outward from the cap assembly and electrically connected with positive and negative current collectors equipped with the electrode assembly.

As shown in FIG. 1, a battery module 100 is formed by connecting each unit cell in series. Each unit cell 111 is arranged, so that a positive terminal 114 and a negative terminal 115 protruding on top of a cap assembly 113 therein alternate with the opposite polarity of another neighboring unit cell 111 and also, so that the positive and negative terminals 114, 115 are formed by threading to be connected through the medium of a connector 116 by using nuts 117, 118.

In other words, each of the terminals 114, 115 is formed as a bolt to be primarily screwed with nuts 117. Then, a connector 116 is fitted thereon to connect a positive terminal 114 of one unit cell and a negative terminal 115 of another neighboring unit cell, and another nuts 118 are screwed on the connector 116 to fix it.

However, this conventional structure of a battery module has a problem of decreasing current collecting efficiency due to strong connection resistances between terminals and a connector.

In other words, since electrons mainly move through the nuts screwed on the terminals to a connector, the passage for electron movement is limited to the small contact area between a nut and a terminal, thus increasing connection resistances and resultantly, decreasing electric conductivity.

Especially, when a secondary battery with large capacity requires high power for driving a motor used for a hybrid electric vehicle (HEV) or an electric vehicle (EV), the aforementioned conventional art cannot establish the desired motor operation characteristics, because the increase of resistances and decrease of electric conductivity cause the decrease of power.

SUMMARY OF THE INVENTION

In order to solve one or more of the aforementioned problems, embodiments of the present invention provide a secondary battery with better electric conductivity and current collecting efficiency by improving the terminal connection structure of unit batteries to maximize the contact areas with a terminal, and a secondary battery module using the same.

In order to accomplish these aspects, embodiments of the present invention provide a battery module including a first unit battery with a first terminal and a second, adjacent unit battery with a second terminal. A connector electrically connects the first terminal and the second terminal. The connector is fixed to the first unit battery through a connecting member. The connecting member is connected to the first terminal and has external threads and a flange on which the connector is positioned. A nut is screwed to the external threads.

Therefore, the connecting member, which electrically connects the first terminal with the connector, increases the contact area between the first terminal and the connector, eventually increasing electric conductivity.

The connecting member is internally threaded on its internal circumferential surface to connect with the externally threaded first terminal. The connecting member is also externally threaded on its external circumferential surface to connect with a nut. The flange on the connecting member is formed along the outer circumferential surface in a lower part of the connecting member.

The connector can be a plate structure made of a conductive material. Holes are formed at both ends of the connector at the same interval as the first and second terminals, so that the connector can be fitted with a connecting member and the first terminal, as well as another connecting member and the second terminal. The second terminal is of the opposite polarity as the first terminal.

In addition, the battery module can have a spring washer between the end of the first terminal and an inside end of an internal groove in the connecting member.

The battery module is formed by connecting the unit cells in series. Here, a positive and negative terminal of the neighboring unit cells can be alternately arranged.

A secondary battery of the present invention includes a case with a space containing an electrode assembly, a cap assembly connected with and sealing the case, and a terminal electrically connected to the electrode assembly. A connecting member is fixed to the terminal outside the cap assembly. The connecting member has an internally threaded hole in its center and is screwed to the terminal. The connecting member also has a flange protruding outwardly toward its bottom, and has external threads that are screwed to a nut.

In addition, a battery module of one embodiment of the present invention is formed with secondary batteries with the above structure as unit cells and includes a first unit battery with a first terminal and an adjacent second unit battery with a second terminal. A connector electrically connects the first and second terminals. A connecting member has a flange protruding outwardly, on which the connector is positioned. The connector also has a hole with internal threads in its center screwed to the first terminal, and external threads screwed to a nut. The connector is fitted with the connecting member and is fixed through the nut.

Accordingly, the connecting member, which electrically connects a terminal and a connector, contacts a substantial surface of the terminal and increases the connector's its contact area, increasing electric conductivity.

In addition, a battery module of the present invention includes a first unit battery with a first terminal and a second unit battery with a second terminal. A connector electrically connects the first terminal and the second terminal, and is closely fixed between a flange protruding from a connecting member and another flange at the bottom outside of a connecting nut. The connecting member also has an internally threaded hole to be screwed to the first terminal.

The flanges of the connecting nut and the connecting member, which both contact the connector, can be formed to have bumps. The connector can also be formed to have bumps.

In addition, the secondary battery can be used as a power source for driving a motor of the machinery such as a hybrid electric vehicle (HEV), an electric vehicle (EV), a wireless cleaner, a motorbike, an electric scooter, and the like.

BRIEF DESCRIPTION OF THE DRAWINGS

The accompanying drawings, which are incorporated in and constitute a part of the specification, illustrate examples of embodiments of the invention, and together with the description, serve to explain the principles of the invention.

DETAILED DESCRIPTION

Figure 1:
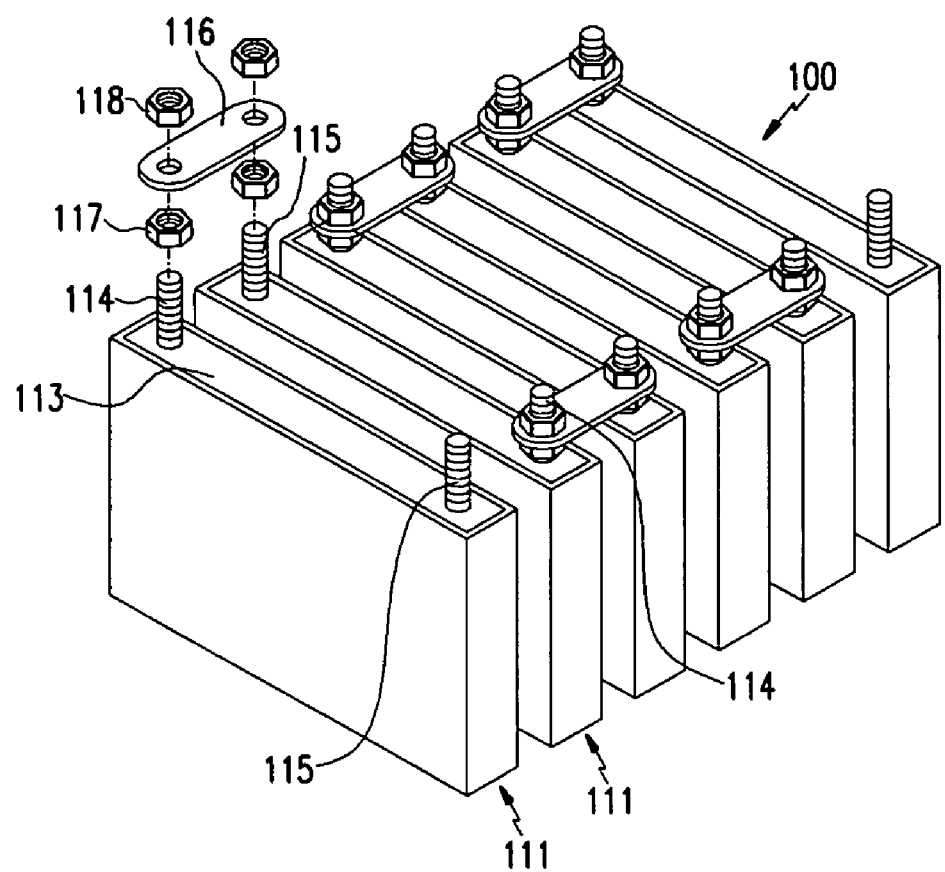
FIG. 1 is an exploded perspective view showing a secondary battery module according to the conventional art.
Figure 2:
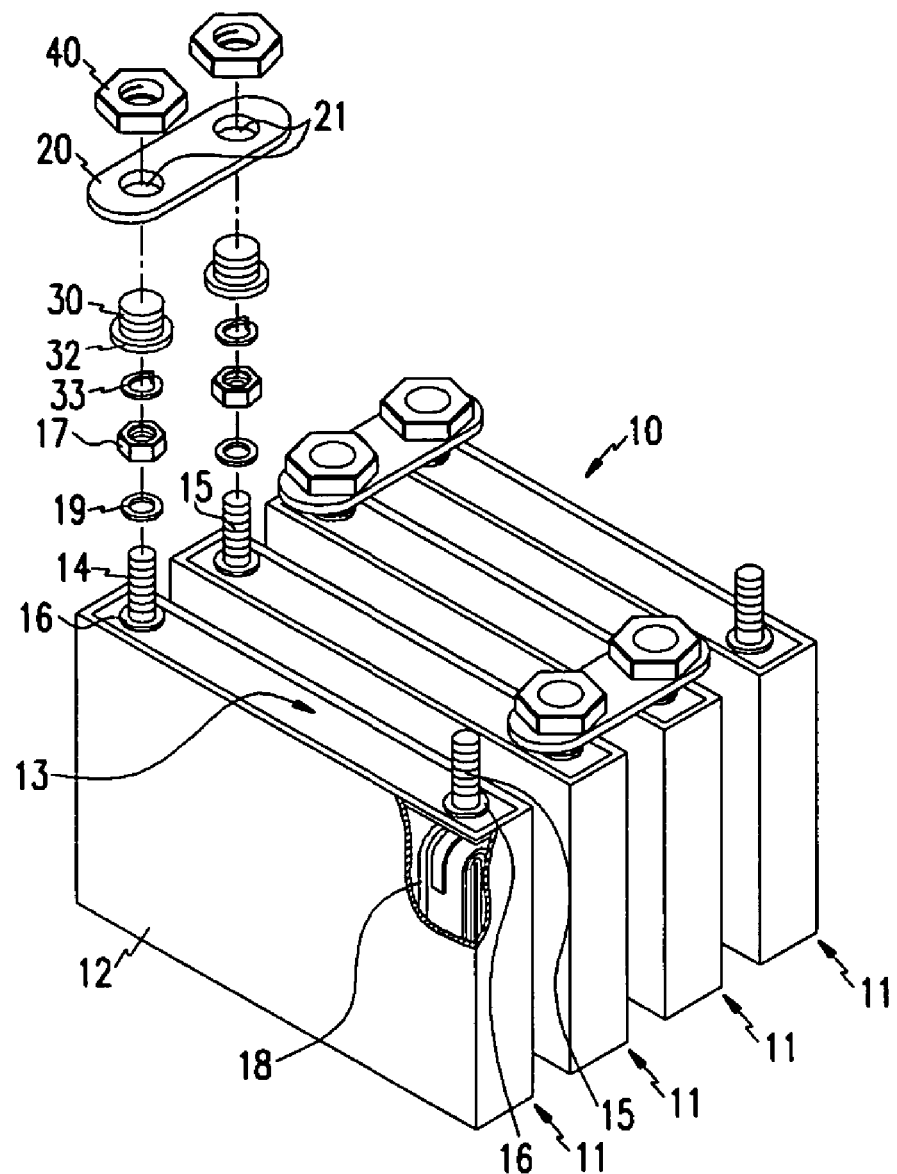
FIG. 2 is an exploded perspective view of a secondary battery according to an embodiment of the present invention.

Referring to FIG. 2, each unit cell 11 forming a battery module 10 with large capacity includes an electrode assembly 18 including positive and negative electrodes and a separator interposed therebetween, a case 12 with a space for housing the electrode assembly, a cap assembly 13 connected with and sealing the case 12, and positive and negative terminals 14, 15 electrically connected respectively to positive and negative current collectors and protruding outward from the cap assembly 13.

The above case 12 is made of conductive metals such as aluminum, aluminum alloy, or nickel-plated steel, and its shape can be a hexagon or cylinder with an internal space for housing an electrode assembly.

According to this embodiment of the present invention, each unit cell 11 has a cap assembly 13 with two positive and negative terminals 14, 15 protruding therefrom at an interval, which will be regarded as an example of a unit cell in the below illustration.

Each unit cell 11 with the above structure is alternately arranged to form a battery module 10, wherein a positive terminal 14 and a negative terminal 15 protruding on top of the cap assembly 13 neighbors the opposite polar terminals 14, 15 of another adjacent battery 11, when the terminals 14, 15, are laid upward.

Therefore, terminal rows are formed at both sides of the unit cells 11, and each row of the terminals include alternating and repeating arrangements of positive and negative terminals in a line. Here, the terminal row can be regarded as a terminal line alternating two different polarities of the terminals.

This embodiment of a secondary battery is equipped with a connector 20 to electrically connect the positive terminals 14 and negative terminals 15 of neighboring unit cells to connect each unit cell 11 in series and form a battery module with the above structure.

Here, the terminals 14, 15 of each unit cell 11 are externally threaded while protruding out of a cap assembly 13 by a gasket and fixed onto the cap assembly 13 by being screwed to a nut 17. A washer 19 is equipped between the nut 17 and a gasket 16.

A method of assembling a connector 20 with the terminals 14, 15 of each unit cell 11, which are assembled on a cap assembly 13, will now be described.

Figure 3:
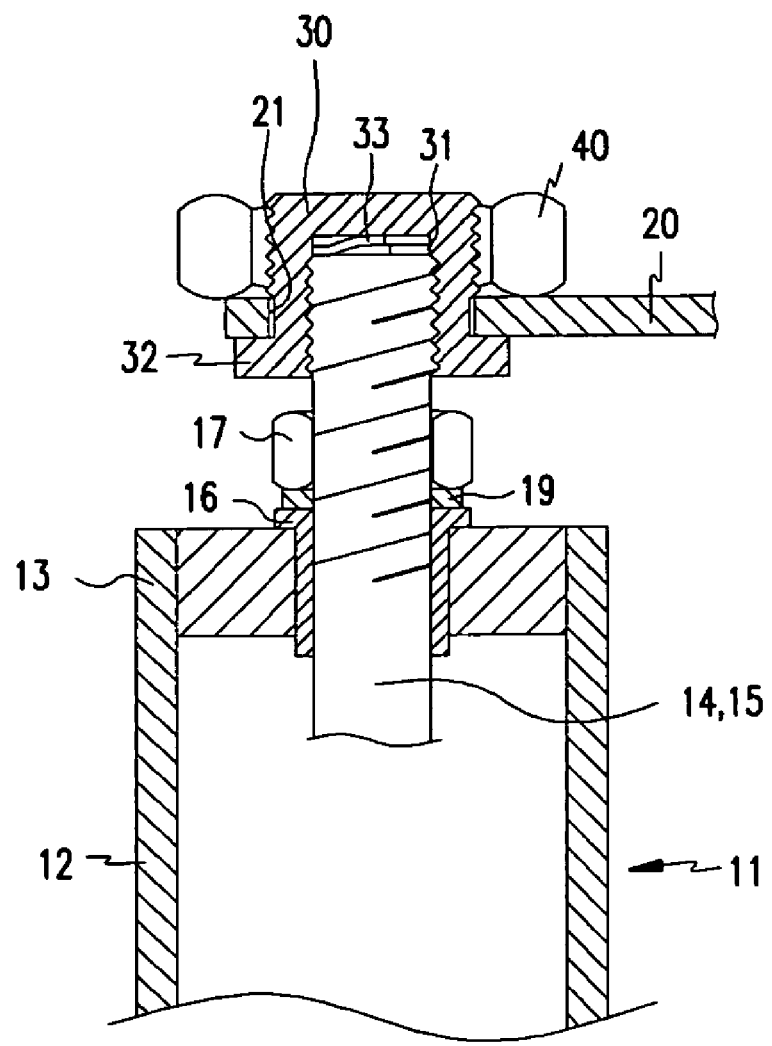
FIG. 3 is a cross-sectional view showing the assembling status of a secondary battery according to an embodiment of the present invention.

As shown in FIG. 3, the connector 20 is fitted with the terminals 14, 15 of the unit cells, and fixed through the medium of a connecting member 30 threaded outside and with a flange 32, which the connector 20 is positioned on, and a nut 40 screwed onto the connecting member 30.

Here, the connecting member 30 is designed to fix a connector 20, and has a groove 31 in its center. The internal circumferential surface of the groove 31 is internally threaded to be screwed and fixed with an externally threaded terminals 14, 15.

Thus, a significant amount of surface of the terminals 14, 15 can contact the connecting member 30.

In addition, the connecting member 30 has a flange 32 protruding from the external circumferential surface of the lower part, where the connector is positioned. The connecting member is externally threaded at its external circumferential surface for connection with the nut 40.

Thus, after the above connector 20 is fitted into the connecting member 30 by being positioned on the flange 32 thereon, it is fixed with the connecting member 30 by screwing a nut 40 onto its external threads formed outside the connecting member 30.

Here, the connector 20 is an assembly structure made of a conductive material and has holes 21 at both ends at the same interval as the connecting members, so that the connector can be fitted with the connecting members 30, which are screwed to a positive or negative terminal of one unit cell and an opposite polarity terminal of another neighboring unit cell.

Holes 21 substantially correspond to the outside diameter of the connecting member 30.

Therefore, a connecting member 30, which electrically connects terminals 14, 15 with a connector 20, provides a significant amount of contact surface area between the terminals 14, 15 and connector 20, increasing electric conductivity.

Here, a spring washer 33 can be additionally equipped between the ends of terminals 14, 15 and the grooves formed inside the connecting member 30 to prevent a connecting member 30 from becoming loose.

A process of equipping a connector 20 of a battery module and its operation will now be described.

Terminals 14, 15 protrude outward from a cap assembly 13 through a gasket 16 and are fixed to the cap assembly 13 by fitting a washer 19 first on the protruding terminal and screwing a nut 17 onto the terminal.

Once the terminals are fixed, the connecting member 30 is coupled to the terminals 14, 15 of each unit cell 11 and then, a connector 20 is assembled with the connecting member 30 thereon and tightened in place by a nut 40 to connect unit cells with the connectors 20 and form a high power battery module 10.

In other words, FIG. 2 shows how a connector 20 is coupled to a unit cell 11. Referring to FIGS. 2 and 3, each unit cell 11 is arranged at a predetermined interval, alternating between a positive terminal 14 and a negative terminal 15 in the arrangement of unit cells.

Then, a connector 20 is fitted into a positive terminal 14 of one unit cell and a negative terminal of another cell arranged immediately adjacent thereto to electrically connect them. Likewise, another connector 20 is fitted into the positive terminal 15 of the second unit cell, which is in the other terminal row, and the negative terminal 15 of a third unit cell 11 that comes next to the second unit cell. This way, all unit cells 11 are connected in series. In order to assemble a connector between terminals as above, a connecting member 30 is assembled into the terminals of each unit cell first.

The connecting member is coupled to the terminals 14, 15 by fitting a spring washer 33 into a threaded groove 31 formed in the center of the connecting member 30 and screwing the external threaded terminals with the groove 31 of the connecting member 30.

Then, a connector 20 is fitted on the connecting member 30 through holes 21 formed thereon and by is positioned on a flange 32 formed outside the connecting member 30.

Next, the connector 20 is fixed onto the terminals by screwing a nut 40 onto the externally threaded connecting member 30. In other words, the connector 20 is fixed with the flange 32 and the nut 40. Therefore, the connecting member 30, which connects the connector 20 with terminals 14, 15, can decrease resistances between the terminals and the connector 20 and increase current collecting efficiency.

In other words, since the connecting member 30 contacts a large surface of terminals 14, 15 through a groove 31 formed inside, current is collected through the whole surface that is in contact with the terminals.

The current, which reaches the connecting members 30 first from the terminals, moves through the connecting member 30, a nut screwed therewith, and a flange formed as a part thereof to the connector 20, maximizing its current collecting efficiency.

A battery module according to another embodiment of the present invention will now be described.

Figure 4:
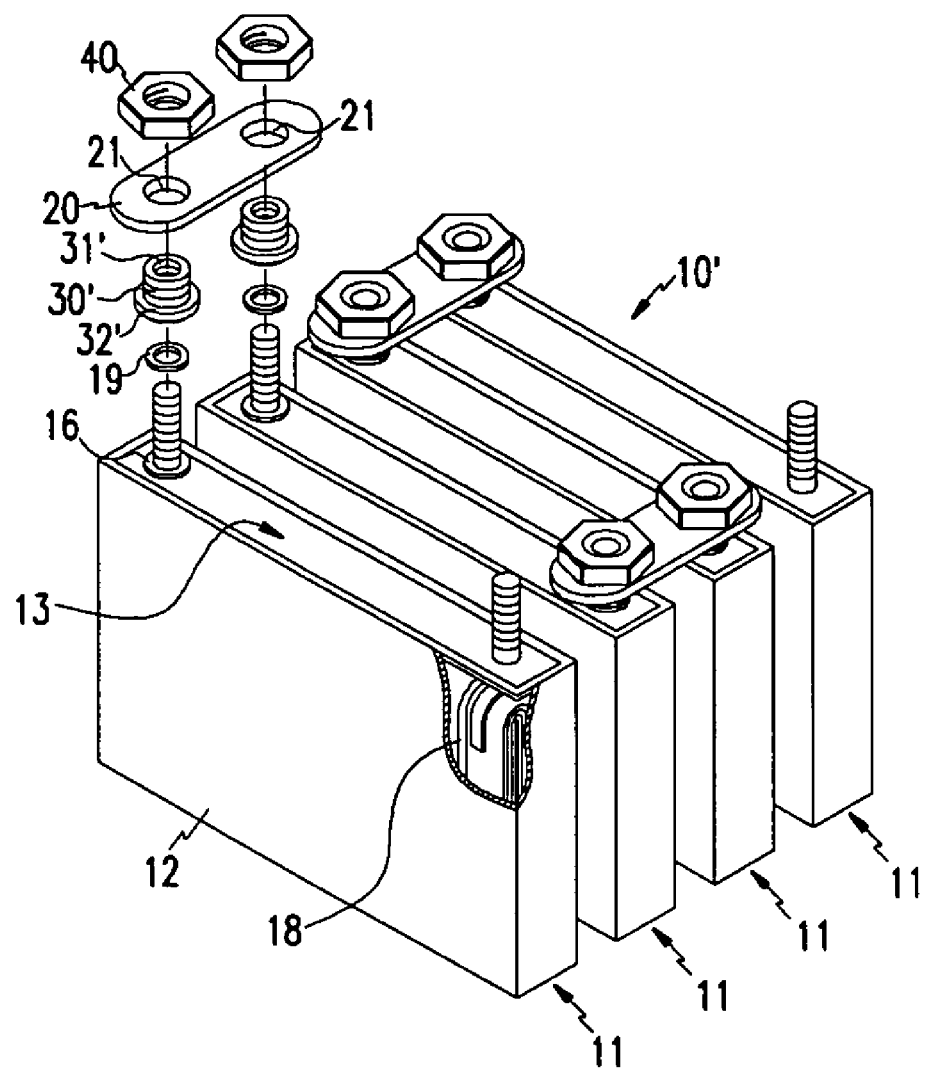
FIG. 4 is an exploded perspective view of the composition of a secondary battery module according to another embodiment of the present invention.

Referring to FIG. 4, each unit cell 11, which composes a battery module 10' with large capacity, includes an electrode assembly 18 having positive and negative electrodes and a separator interposed therebetween, a case 12 with a space, for housing the electrode assembly 18, a cap assembly 13 combined with and sealing the case 12, positive and negative terminals 14, 15 electrically connected with positive and negative current collectors and protruding out of the cap assembly, and a connecting member 30' fixing the positive and negative terminals with the cap assembly 13.

Here, the connecting member 30' has an internally threaded hole 31' in the center to be screwed to external threaded terminals 14, 15 and externally threaded at its external circumferential surface to be screwed to nuts 40. The connecting member 30' further has a flange 32' protruding alongside the bottom end, wherein a connector 20 is positioned to connect between the terminals 14, 15 of neighboring unit cells 11.

The case 12 is fabricated of conductive metal such as aluminum, aluminum alloy or nickel-plated steel, and its shape can be a hexagon or others with a space for housing the electrode assembly can be housed.

According to this embodiment of the present invention, each unit cell 11 has two protruding terminals at a predetermined interval, that is, a positive terminal 14 and a negative terminal 15. A unit cell with this structure will be illustrated as an example.

In order to compose a battery module 10 with large capacity, unit cells 11 stand with terminals 14, 15 protruding upward on top of the cap assembly, wherein the positive or negative terminal 14, 15 of one unit cell 11 alternates from its neighboring unit cell 11.

Accordingly, terminal rows are formed by alternating each positive and negative terminal at a predetermined interval at both sides of the unit cells. Here, the terminal rows can be understood as one line of terminals formed by alternately lining opposite polar terminals adjacent to one another.

Here, the terminals 14, 15 of each unit cell protrude as a bolt through a gasket 16 on the cap assembly 13 and assembled and fixed on the cap assembly 13 by being screwed to the connecting member 30'. A washer 19 is equipped between the connecting member 30' and a gasket 16.

A connector 20 is equipped to electrically connect between two opposite positive and negative terminals 14, 15 of neighboring unit cells, connecting a plurality of unit cells in series or in parallel and forming a battery module with large capacity.

The assembly of the connector with terminals 14, 15 of each unit cell 11, which are already assembled on the cap assembly 13 will now be described.

Figure 5:
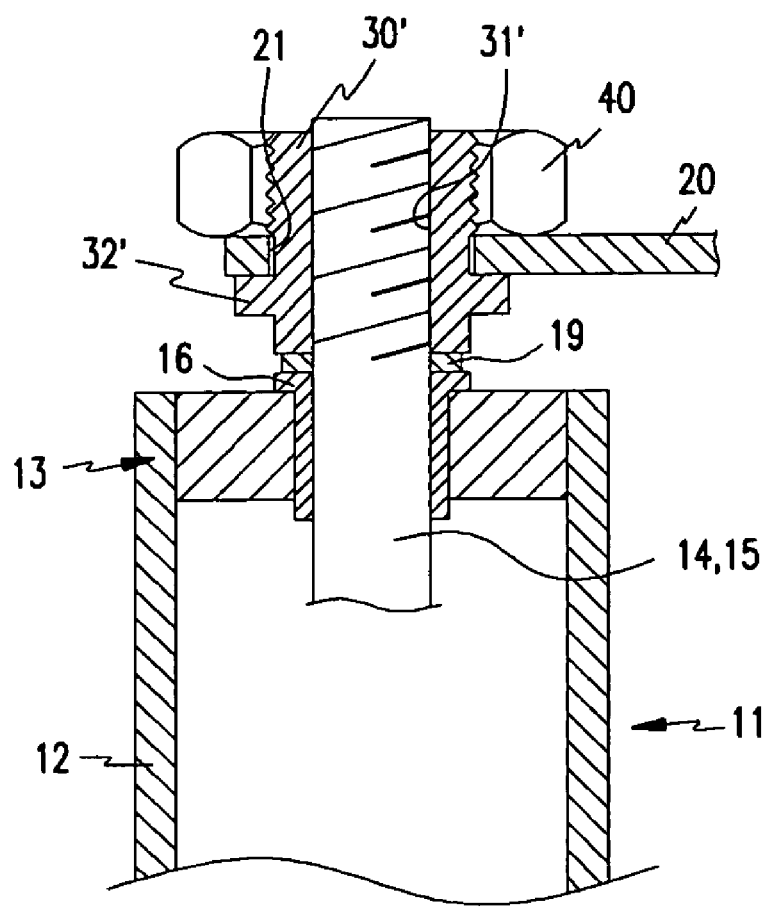
FIG. 5 is a cross-sectional view showing the assembling status of a secondary battery according to another embodiment of the present invention.

As shown in FIG. 5, the connector 20 is equipped by using a connecting member 30', which is already assembled with the terminals 14, 15 of each unit cell. In other words, the connector 20 is fixed through the medium of the connecting member 30', which has a flange 32', whereon the connector 20 is positioned, and is externally threaded at external circumferential surface, and a nut 40, which is screwed to the externally threaded connecting member 30'.

Here, since the connecting member 30' is screwed together through an internally threaded hole 31' with external threaded terminals 14, 15, it can contact a large surface of terminals 14, 15.

In addition, the connecting member has a flange 32' protruding alongside the outside bottom, whereon a connector 20 is positioned, and the external circumferential surface is externally threaded.

Therefore, when the connector 20 is positioned on the flange 32' of the connecting member 30' and fitted therewith, it can be assembled and fixed with the connecting member 30' by a nut 40 screwed to an externally threaded connecting member 30'.

The above connector 20 is an assembly structure made of a conductive material and has holes 21 at both of its ends at the same interval as the connecting members 30' of neighboring unit cells, so that it can be fitted with the connecting member 30' equipped with both of a positive or negative terminal of one unit cell and the opposite polarity terminal of another neighboring unit cell.

The size of the holes 21 substantially corresponds to the external diameter of the connecting member 30'.

Therefore, since the connecting member contacts a large surface of terminals 14, 15 and electrically connects them with a connector 20, it increases the contact area with the terminals and eventually, increases the electric conductivity.

A process of equipping a connector 20 of embodiment of battery modules in the present invention and their operation will now be described with reference to FIGS. 4 and 5.

Terminals 14, 15 of each unit cell 11 protrude out of the cap assembly 13 through a gasket 16, and a connecting member 30' is joined with the terminals 14, 15 through the medium of a washer 19, thus fixing the terminal 14, 15 with the cap assembly.

In other words, an internally threaded hole 31' of the connecting member 30' is screwed to a bolt of the terminals 14, 15, attaching a connecting member 30' with the terminals and thus fixing them with the cap assembly.

Once the terminals are fixed like above, a connector 20 is assembled with the terminals of each unit cell 11, connecting each battery to form a high power battery module.

In other words, as seen in FIG. 4, each unit cell 11 is arranged at a predetermined interval, alternating positive and negative terminals 14, 15 therein.

Here, a connector 20 is fitted with a positive terminal 14 of one unit cell and a negative terminal 15 of another unit cell arranged immediately adjacent to it to electrically connect them. Another connector is fitted with and connects another positive terminal 14 of the second unit cell in another terminal row and another negative terminal 15 of the third unit cell arranged immediately adjacent to the second one, connecting all unit cells 11 in series.

Assembly of a connector 20 between terminals will now be described.

A connector is fitted with connecting members 30' that are joined with terminals 14, 15 of two neighboring unit cells through holes formed thereon. The connector is positioned on a flange 32' protruding outwardly from the connecting member 30'. Then, the connector 20 is fixed by screwing external threads of the connecting member 30' with a nut 40. Thus, the connector 20 is fixed between a flange 32' of the connecting member 30' and the nut 40.

Therefore, the connector 20 is connected with terminals 14, 15 through the connecting member 30', decreasing resistances between the connector and terminals and increasing current collecting efficiency. In other words, the current collection is performed through a large surface of the terminals 14, 15, which the connecting member 30' contacts with the inside internally threaded hole 31.

The current collecting efficiency can be maximized accordingly, as the current leaves the terminal, moves through the connecting member 30', a flange 32' formed as a part of the connecting member, and a nut 40, to the connector 20.

Figure 6:
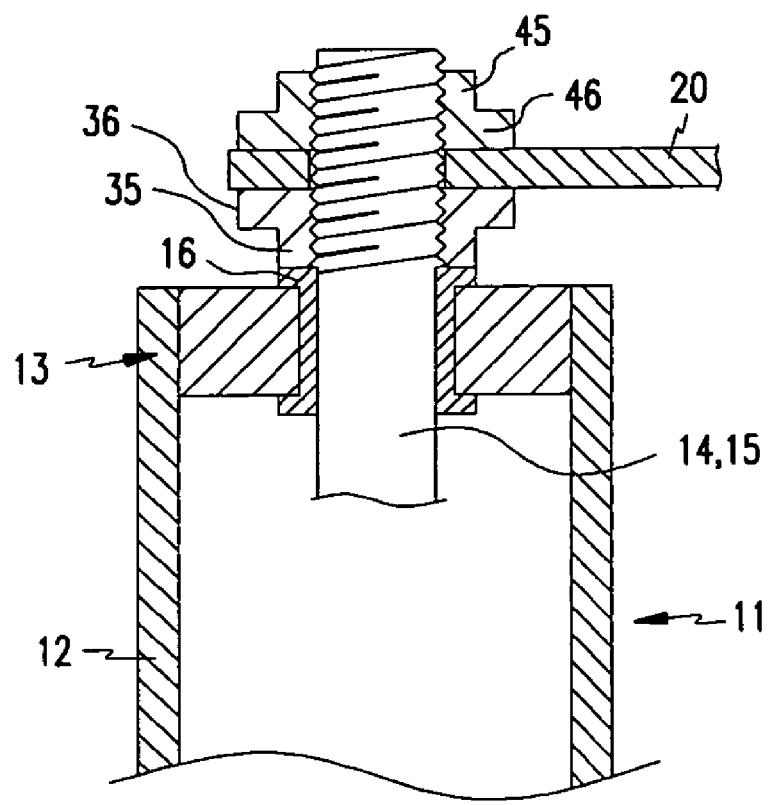
FIGS. 6 and 7 are cross-sectional views showing the assembling status of a secondary battery according to yet another embodiment of the present invention.

FIG. 6 is a cross-sectional view of the assembly status of a battery module according to another embodiment of the present invention. A connector 20 is fixed by using a connecting member 35, which is already fitted with terminals 14, 15 of a unit cell, and a connecting nut 45, which fixes the connector 20 with the connecting member 35.

The connecting member has an internally threaded hole in the center to be screwed to external threaded terminals 14, 15 and a flange 36 formed by extending the upper end thereof.

The connector 20, which is fitted with the terminal 14, 15, is positioned on the flange 36 of the connecting member 35.

In addition, the connecting nut 45 has an internally threaded hole in the center to be screwed to the terminals 14, 15 and a flange 46 extended outward at the bottom. Accordingly, the connector 20 is tightened with the flange 46 of the connecting nut 45, as the connector 20 is positioned on the flange 36 of the connecting member 35 and the nut 45 is screwed.

Therefore, the connector 20 connects unit batteries 11, closely tightened with the flange 36 of the connecting member 35 and another flange 46 of the connecting nut 45.

Figure 7:
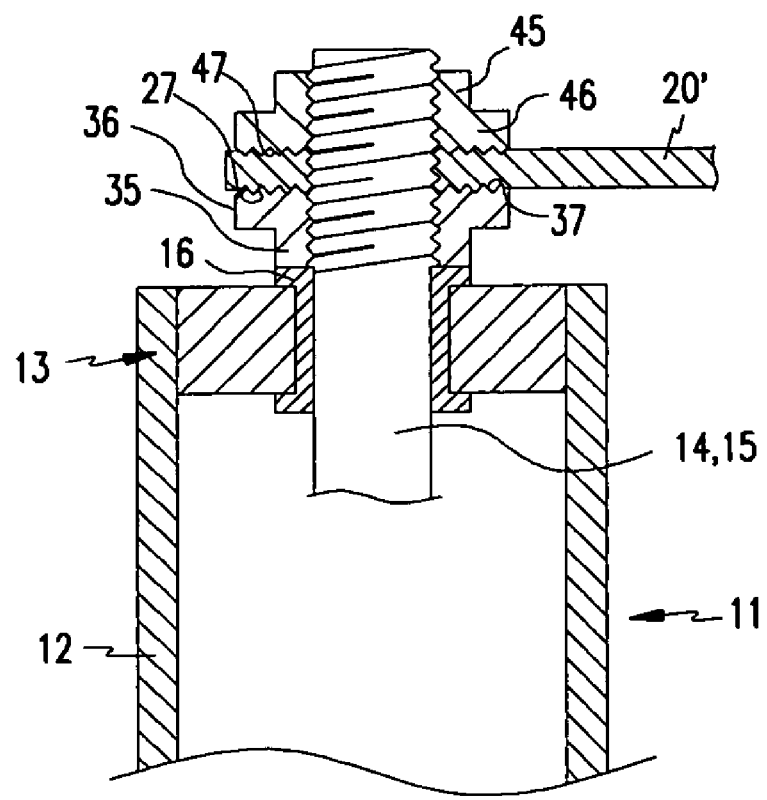

Referring now to FIG. 7, the flange of the connecting member 35 may have small bumps 37 in the upper surface. The bumps 37 can be formed regularly or irregularly on the flange 36 without any particular limitations, and play a role of decreasing resistances by increasing adherences between the connector 20' and the flange 36. Bumps 27, 47 can also be respectively formed on the connector 20' and the upper flange 46, as shown.

Figure 8:
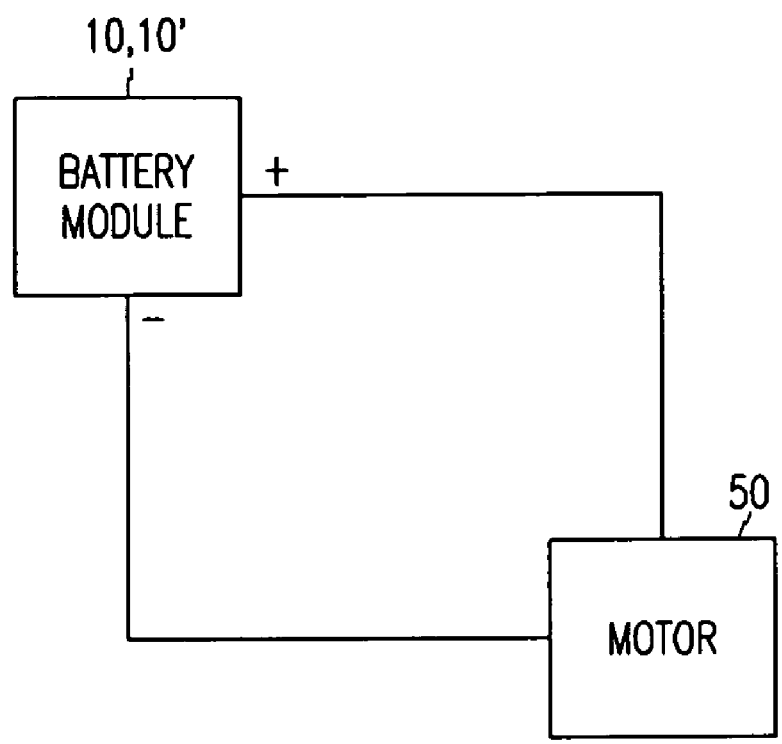
FIG. 8 is a schematic block diagram showing a secondary battery module driving a motor according to an embodiment of the present invention.

The remaining elements shown in FIGS. 6 and 7 are assigned the same reference numbers as the earlier described embodiments and operate similarly. The explanation of the previously described elements thus will not be further provided herein. FIG. 8 is a schematic block diagram of a secondary battery module 10, 10' as discussed in FIG. 2 or 4 driving a motor 50.

The above-described embodiments of the present invention can establish a battery module with improved current collecting efficiency by increasing contact areas between a connector and terminals and decreasing resistances therebetween.

Furthermore, the above-described embodiments of the battery modules can have improved power through the increased current collecting efficiency.

While the present invention has been described in detail with reference to examples of embodiments, those skilled in the art will appreciate that various modifications and substitutions can be made thereto without departing from the spirit and scope of the present invention as set forth in the appended claims and their equivalents.

What is claimed is:

1. A secondary battery module comprising:
  a first unit battery having a first terminal extending therefrom, the first terminal having an external thread;
  a second unit battery adjacent to the first unit battery and having a second terminal extending therefrom, the second terminal having an opposite polarity from the first terminal;
  a connecting member having an external thread, an internal thread and a flange, the internal thread of the connecting member coupled to the external thread of the first terminal;
  a connector electrically connecting the first unit battery and the second unit battery, the connector on the flange and fitted with the connecting member; and
  a nut screwed to the external thread of the connecting member and coupling the connector to the connecting member.

2. The secondary battery module of claim 1, further comprising a cap assembly on the first unit battery, and wherein the first terminal protrudes from the cap assembly through a gasket and is coupled to the cap assembly through a nut.

3. The secondary battery module of claim 1, wherein the connector has a hole adjacent an end of the connector, the hole configured to be fitted with the connecting member and one of the first terminal and the second terminal.

4. The secondary battery module of claim 3, wherein a diameter of the hole on the connector substantially corresponds to a diameter of the connecting member.

5. The secondary battery module of claim 1, further comprising spring washers at the first terminal and proximate to the connecting member.

6. The secondary battery module of claim 1, wherein the secondary battery module is configured for driving a motor.

* * * * *

UNITED STATES PATENT AND TRADEMARK OFFICE
CERTIFICATE OF CORRECTION

| | | |
|---|---|---|
| PATENT NO. | : 7,614,906 B2 | Page 1 of 1 |
| APPLICATION NO. | : 11/261021 | |
| DATED | : November 10, 2009 | |
| INVENTOR(S) | : Kim et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1017 days.

Signed and Sealed this

Fourteenth Day of December, 2010

David J. Kappos
*Director of the United States Patent and Trademark Office*